US011866052B2

(12) United States Patent
Zengin et al.

(10) Patent No.: US 11,866,052 B2
(45) Date of Patent: Jan. 9, 2024

(54) DISTRIBUTED COMPUTING SYSTEM FOR DETERMINING ROAD SURFACE TRACTION CAPACITY

(71) Applicant: GM Global Technology Operations LLC, Detroit, MI (US)

(72) Inventors: Halit Zengin, Bowmanville (CA); Joseph K. Moore, Whitby (CA); Carlos Eduardo Arreaza, Oakville (CA); Amin Abdossalami, Markham (CA); Swee Meng Yong, Canton, MI (US); Yassir E. Elrayah, Canton, MI (US); Donald K. Grimm, Utica, MI (US); Fan Bai, Ann Arbor, MI (US); Jinzhu Chen, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 150 days.

(21) Appl. No.: 17/528,367

(22) Filed: Nov. 17, 2021

(65) Prior Publication Data

US 2023/0150511 A1    May 18, 2023

(51) Int. Cl.
*B60W 40/068* (2012.01)
*B60W 40/13* (2012.01)
(Continued)

(52) U.S. Cl.
CPC ......... *B60W 40/068* (2013.01); *B60T 8/1763* (2013.01); *B60W 10/18* (2013.01);
(Continued)

(58) Field of Classification Search
CPC .... B60W 40/068; B60W 10/18; B60W 40/13; B60W 2552/40; B60W 2555/20;
(Continued)

(56) References Cited

U.S. PATENT DOCUMENTS

| 4,882,693 | A | * | 11/1989 | Yopp | ....................... | B60T 8/172 |
|  |  |  |  |  |  | 73/9 |
| 2002/0016653 | A1 | * | 2/2002 | Levine | ....................... | B60T 7/12 |
|  |  |  |  |  |  | 701/1 |

(Continued)

OTHER PUBLICATIONS

"Harnessing multimodal data integration to advance precision oncology" by Boehm, K.M, et al Nat Rev Cancer 22, 114-126 (2022) (publishing data is Oct. 18, 2021—see attached BIB sheet) (Year: 2021).*

(Continued)

*Primary Examiner* — Peter D Nolan
*Assistant Examiner* — Tanya C Sienko
(74) *Attorney, Agent, or Firm* — Vivacqua Crane, PLLC

(57) ABSTRACT

A distributed computing system for determining road surface traction capacity for roadways located in a common spatio-temporal zone includes a plurality of vehicles that each include a plurality of sensors and systems that collect and analyze a plurality of parameters related to road surface conditions in the common spatio-temporal zone. The distributed computing system also includes one or more central computers in wireless communication with each of the plurality of vehicles. The one or more central computers execute instructions to determine a road surface traction capacity value for the common spatio-temporal zone.

20 Claims, 5 Drawing Sheets

(51) Int. Cl.
  *B60W 10/18* (2012.01)
  *B60T 8/1763* (2006.01)
  *H04W 4/46* (2018.01)

(52) U.S. Cl.
  CPC .............. *B60W 40/13* (2013.01); *H04W 4/46* (2018.02); *B60W 2552/40* (2020.02); *B60W 2555/20* (2020.02); *B60W 2556/10* (2020.02); *B60W 2556/65* (2020.02)

(58) Field of Classification Search
  CPC ........... B60W 2556/10; B60W 2556/65; B60T 8/1763; H04W 4/46
  See application file for complete search history.

(56) References Cited

U.S. PATENT DOCUMENTS

| | | | |
|---|---|---|---|
| 2016/0280224 A1* | 9/2016 | Tatourian | B60W 50/14 |
| 2017/0166216 A1* | 6/2017 | Rander | B60W 30/18172 |
| 2017/0167881 A1* | 6/2017 | Rander | G05D 1/0274 |
| 2017/0168495 A1* | 6/2017 | Wood | B60W 10/184 |
| 2018/0012490 A1* | 1/2018 | Jodorkovsky | G08G 1/096725 |
| 2018/0215391 A1* | 8/2018 | Chen | B60W 40/068 |
| 2019/0047574 A1* | 2/2019 | Nishi | B60W 50/0097 |
| 2019/0389475 A1* | 12/2019 | Jonasson | G08G 1/0112 |
| 2020/0033137 A1* | 1/2020 | Hartmann | G01C 21/3848 |
| 2020/0139976 A1* | 5/2020 | Magnusson | G01C 21/3822 |
| 2020/0148213 A1* | 5/2020 | Gawande | G06V 20/56 |
| 2020/0380805 A1* | 12/2020 | Kakehi | B60W 40/068 |
| 2021/0065565 A1* | 3/2021 | Dow | G08G 5/0013 |
| 2021/0188284 A1* | 6/2021 | Hassel | B60W 10/20 |
| 2021/0206379 A1* | 7/2021 | Bobier-Tiu | G06T 17/10 |
| 2022/0048514 A1* | 2/2022 | Stenneth | B60W 30/18172 |
| 2022/0207930 A1* | 6/2022 | Kim | H04L 63/10 |
| 2022/0234590 A1* | 7/2022 | Laruelo | B60W 40/068 |
| 2022/0269349 A1* | 8/2022 | Nagar | G06F 3/013 |
| 2022/0388516 A1* | 12/2022 | Laruelo | G08G 1/0112 |

OTHER PUBLICATIONS

"Jaccard index" Wikipedia, Obtained from Wayback machine Oct. 26, 2021 (Year: 2021).*

"Pavement Condition Monitoring with Crowdsourced Connected Vehicle Data", E.P. Dennis et al., Transportation Research Record: Journal of the Transportation Research Board, No. 2460, Transportation Research Board of the National Academies, Washington, D.C., 2014, pp. 31-38. (Year: 2014).*

"Multimodal Data Fusion: An Overview of Methods, Challenges and Prospects" Dana Lahat, Tülay Adali, Christian Jutten. Proceedings of the IEEE, Institute of Electrical and Electronics Engineers, 2015, Multimodal Data Fusion, 103 (Year: 2015).*

"Using Crowdsourced Vehicle Braking Data to Identify Roadway Hazards" Howell Li, Jijo Mathew, Woosung Kim and Darcy Bullock JTRP Affiliated Reports. Paper 34. Looks to have been uploaded to database Nov. 10, 2020 (Year: 2020).*

"Real-time Estimation of Tire-Road Friction Peak with Optimal Linear Parameterization", R. de Castro et al., IET Control Theory and Applications 6(14):2257-2268 (Year: 2012).*

"BigRoad: Scaling Road Data Acquisition for Dependable Self-Driving" L.Liu et al. MobiSys '17, Jun. 19-23, 2017, Niagara Falls, NY, USA. (Year: 2017).*

"Towards Quality-Aware Big Data Integration for Crowdsourced Road Sensing System" by L. Su et al, Final Report of Tier I University Transportation Center, Nov. 2017 (Year: 2017).*

* cited by examiner

DISTRIBUTED COMPUTING SYSTEM FOR DETERMINING ROAD SURFACE TRACTION CAPACITY

INTRODUCTION

The present disclosure relates to a distributed computing system for determining road surface traction capacity for roadways located in a common spatio-temporal zone based on aggregated vehicle sensor data collected from a plurality of vehicles in combination with weather and application programming interface data.

Traction is the grip between a vehicle's tires and the surface of the road, which allows the vehicle to stop, start, and change a direction of travel. However, road surface conditions and adverse weather conditions may diminish a vehicle's traction. Specifically, slippery roads caused by ice and snow may be challenging for a vehicle to drive and maintain traction upon. Various systems presently exist to assist a driver when navigating slippery or challenging roadway surfaces. For example, a traction control system (TCS) may prevent wheel spin that occurs due to acceleration upon a slippery road. An anti-lock braking system (ABS) may prevent the vehicle's wheels from locking up during braking, thereby maintaining tractive contact with the road surface. An electronic stability control (ESC) system monitors various vehicle sensors such as, but not limited to, wheel speed sensors, a steering angle sensor, and lateral acceleration sensors. If the ESC system detects a loss of steering control, which is the difference between a driver's intended path and the actual vehicle path, then the ESC system may respond by stabilizing the vehicle through wheel-specific brake intervention and adjustment of the engine torque Various government agencies and municipalities may employ various techniques during adverse weather conditions in order to maintain road surface traction capacity. For example, chemicals such as sodium chloride, magnesium chloride, and calcium chloride may be used to prevent and remove snow and ice from roadways.

While current snow and ice removal techniques achieve their intended purpose, there is a need in the art for an improved system for determining when as well as a specific location where snow and ice may need to be removed from a roadway based on determining road surface traction capacity.

SUMMARY

According to several aspects, a distributed computing system for determining road surface traction capacity for roadways located in a common spatio-temporal zone is disclosed. The distributed computing system includes a plurality of vehicles that each include a plurality of sensors and systems that collect and analyze a plurality of parameters related to road surface conditions in the common spatio-temporal zone, where the plurality of parameters include a traction level for a selected vehicle. The distributed computing system also includes one or more central computers in wireless communication with each of the plurality of vehicles, where the one or more central computers execute instructions to determine at least one of a perfect match value and a partial match value between two contextual data points between two discrete vehicles that are part of the plurality of vehicles, where the two contextual data points are part of the plurality of parameters, and combine at least one of the perfect match value and the partial match value with the traction level corresponding to the selected vehicle to determine a road surface traction capacity value for the common spatio-temporal zone.

In one aspect, the perfect match value indicates that that two contextual data points between two discrete vehicles are of the same contextual data type and the partial match value indicates the two contextual data points between the two discrete vehicles are of partially similar contextual data types.

In another aspect, the perfect match value is determined based on:

$$\frac{\sum_{u \in N} (r_{u,i} - r_a) \times sim(a, u) \omega(a)}{\sum_{u \in N} sim(a, u)}$$

where $r_a$ is the traction level of the selected vehicle with respect to the contextual data point, $r_{u,i}$ is the traction level of a neighboring vehicle, $sim(a, u)$ represents a context similarity between the selected vehicle and a neighboring vehicle, and $\omega(a)$ is a participant weight for the selected vehicle.

In yet another aspect, the partial match value is determined based on:

$$J(X, Y, w) \times \frac{\sum_{u \in M} (r_{u,i} - r_a) \times sim(a, u) \omega(a)}{\sum_{u \in M} sim(a, u)}$$

where $r_a$ is a traction level of the selected vehicle with respect to the contextual data point, $r_{u,i}$ is a traction level of a neighboring vehicle, $sim(a, u)$ represents a context similarity between the selected vehicle and a neighboring vehicle, $\omega(a)$ is a participant weight for the selected vehicle, X and Y represent two data sets for comparison and matching to determine a Jaccard weight, w is a function to convert the two data sets corresponding to X and Y into real values, and J(X, Y, w) represents the Jaccard weight.

In one aspect, the road surface traction capacity value for the common spatio-temporal zone is determined based on:

$$P_{u,i} = r_a + \frac{\sum_{u \in N} (r_{u,i} - r_a) \times sim(a, u) \omega(a)}{\sum_{u \in N} sim(a, u)} + $$

$$J(X, Y, w) \times \frac{\sum_{u \in M} (r_{u,i} - r_a) \times sim(a, u) \omega(a)}{\sum_{u \in M} sim(a, u)}$$

where $P_{u,i}$ represents the road surface traction capacity value for the common spatio-temporal zone and u denotes the neighboring vehicle.

In another aspect, the contextual data types include one or more of the following: temporal context data, spatial context data, weather context data including wiper status, temperature, pressure, and presence of rain, vehicle type, tire wear condition, lane context, road surface condition, driver behavior, high excitation context collected from the plurality of sensors and systems, and low excitation context collected from the plurality of sensors and systems.

In yet another aspect, the plurality of sensors and systems produce a response indicating a condition indicative of the road surface traction capacity for the common spatio-temporal zone.

In still another aspect, the response is a high excitation context, a low excitation context, or both.

In another aspect, each of the plurality of vehicles include one or more controllers, and where the one or more controllers for each of the vehicles applies an intensification gain to the high excitation context and the low excitation context.

In yet another aspect, the one or more controllers determine the traction level for the selected vehicle based on an intensity adjusted high excitation context and an intensity adjusted low excitation context.

In an aspect, the high excitation context is either an anti-lock braking system (ABS) traction level or a traction control system (TCS) traction level.

In another aspect, the ABS traction level and the TCS traction level are classified into a plurality of different levels indicating varying levels of traction.

In yet another aspect, the ABS traction level is determined based on a deceleration of a specific vehicle, a spatio-temporal zone representing a mapping of the specific vehicle to a geo-location and time, and a spatio-temporal ABS intensity based on a total number of braking events of interest and a total ABS event score.

In still another aspect, the TCS traction level is determined based on a vehicle speed, a spatio-temporal zone representing a mapping of a specific vehicle to a geolocation and time, and a spatio-temporal TCS intensity based on a total number of acceleration events of interest and a total TCS event score.

In an aspect, the one or more controllers extract vehicle contextual parameters based on the high excitation context, the low excitation context, external environment information from a plurality of environmental context sensors, and vehicle-based contextual information collected by one or more remaining vehicle controllers.

In another aspect, the plurality of sensors and systems of each of the plurality of vehicles include one or more of the following: a TCS, an ABS, an electronic stability system (ESC), a brake pedal position sensor, a brake pressure sensor, a brake torque sensor, an engine speed sensor, wheel speed sensors, an inertial measurement unit sensor, an accelerator pedal position sensor, a vehicle speed signal, a commanded torque signal and one or more cameras.

In yet another aspect, the one or more central computers receives weather and application programming interface data related to the common spatio-temporal zone over a network.

In still another aspect, the weather and application programming interface data includes one or more of the following: precipitation, humidity, number of lanes in road, type of road, road surface, age of road, map data, bank angle of road, road curvature, on road segment edge or at node, and grade of road.

In an aspect, the common spatio-temporal zone represents a common geographical area and time step experiencing similar weather conditions, wherein an overall size of the common geographical location and time step is adjustable.

In an aspect, a method for determining road surface traction capacity for roadways located in a common spatio-temporal zone is disclosed. The method includes receiving, by one or more central computers that are part of a back-end office, a plurality of parameters from a plurality of vehicles, wherein the plurality of parameters related to road surface conditions in the common spatio-temporal zone and the plurality of parameters include a normalized intensity value indicating a level of traction for a selected vehicle of the plurality of vehicles. The method also includes determining, by the one or more central computers, at least one of a perfect match value and a partial match value between two contextual data points between two discrete vehicles that are part of the plurality of vehicles, where the two contextual data points are part of the plurality of parameters. The method also includes combining at least one of the perfect match value and the partial match value with the traction level corresponding to the selected vehicle to determine a road surface traction capacity value for the common spatio-temporal zone.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
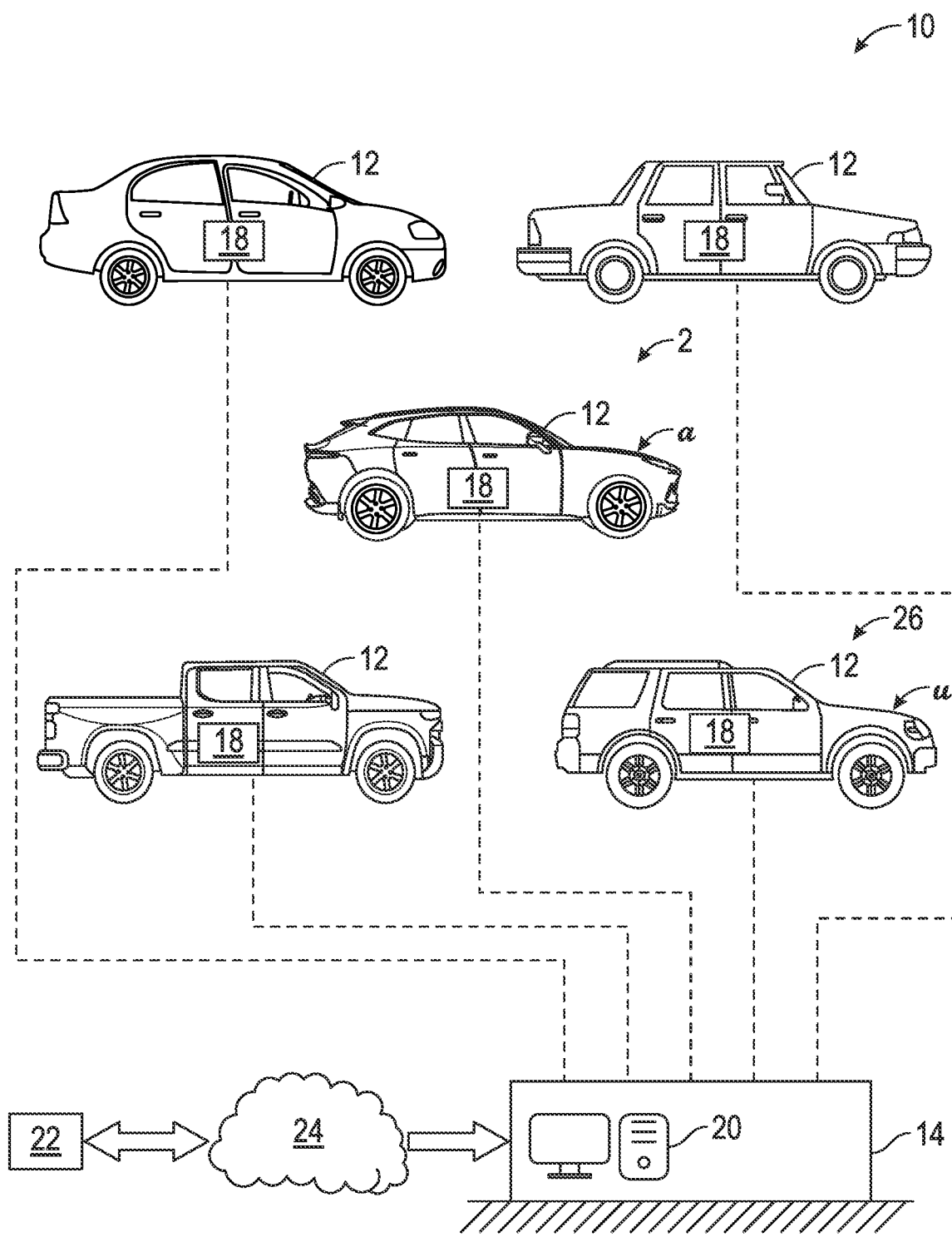
FIG. 1 is a schematic diagram of the disclosed distributed computing system for determining road surface traction capacity, where the system includes a plurality of vehicles that are each in wireless communication with a back-end office, according to an exemplary embodiment.

Referring to FIG. 1, an exemplary distributed computing system 10 for determining road surface traction capacity for roadways located in a common spatio-temporal zone is illustrated. The distributed computing system 10 includes a plurality of vehicles 12 in wireless communication with a back-end office 14. The plurality of vehicles 12 may include any type of vehicle having wireless capabilities connected to the back-end office 14 such as, but not limited to, a sedan, truck, sport utility vehicle, van, or motor home. As explained below, each of the plurality of vehicles 12 include a plurality of sensors and systems 18 that collect and analyze data related to road surface conditions within the a common spatio-temporal zone, where the data related to road surface conditions for each of the plurality of vehicles 12 is sent to the back-end office 14. In an embodiment, the back-end office 14 also receives weather and application programming interface data 22 related to the common spatio-temporal zone over a network 24, however, it is to be appreciated that the weather and application programming interface data 22 may come from other sources as well such as, for example, a third-party service or collected and aggregated as part of vehicle telemetry. The back-end office 14 includes one or more central computers 20 for aggregating and fusing the data related to road surface conditions from the plurality of vehicles 12 in in combination with the weather and application programming interface data 22 to determine road surface traction capacity for roadways located in the common spatio-temporal zone.

The road surface traction capacity related to the common spatio-temporal zone may be used in a variety of situations. For example, government agencies and municipalities may determine when to salt, sand, plow, or de-ice various roadways within the common spatio-temporal zone based on the road surface traction capacity. The common spatio-temporal zone represents a common geographical location and time step experiencing similar weather conditions, where an overall size of the common geographical location and time step is adjustable. For example, in one embodiment, the common geographical location encompasses a specific area of a state (e.g., southeast Michigan) or a particular metropolitan area (e.g., the New York metropolitan area) and the time step is about 15 minutes. In another embodiment, the common geographical location may encompass a smaller geographical area instead. For example, the common geographical location may encompass a particular neighborhood in a city, a specific bounding box within a city or a neighborhood, a latitude/longitudinal grid, or, in the alternative, a specific segment or section of roadway.

Figure 2:
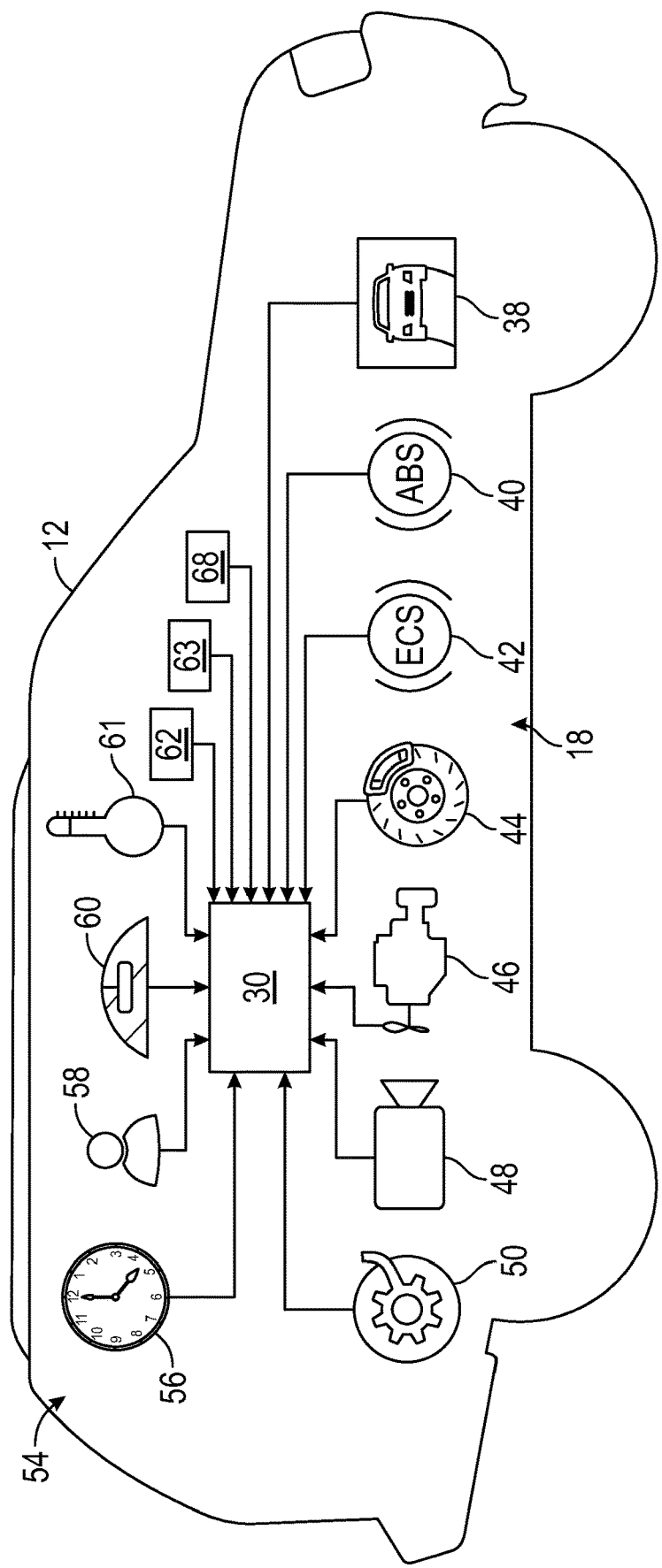
FIG. 2 is a schematic diagram of one of the vehicles shown in FIG. 1 including one or more controllers in electronic communication with a plurality of sensors and systems, a plurality of environmental context sensors, and one or more remaining vehicle controllers, according to an exemplary embodiment.

The distributed computing system 10 executes algorithms that are distributed between the plurality of vehicles 12 and the central computers 20 that are part of the back-end office 14. FIG. 2 is an illustration of a single vehicle 12 that is representative of each of the plurality of vehicles 12. As seen in FIG. 2, each vehicle 12 includes one or more controllers 30 in electronic communication with the plurality of sensors and systems 18. Although FIG. 2 only illustrates the vehicle 12 including a single controller 30, it is to be appreciated that more than one controller 30 may be used as well. As explained below, the one or more controllers 30 of each vehicle 12 perform edge-based processing to determine a plurality of parameters 36 (seen in FIG. 3) based on the data related to road surface conditions collected from the plurality of sensors and systems 18. As explained below, the central computers 20 that are part of the back-end office 14 (seen in FIG. 1) receive the plurality of parameters 36 related to a specific vehicle 12 from each of the plurality of vehicles 12 located within the common spatio-temporal zone, and aggregates and fuses the plurality of parameters 36 together to determine the road surface traction capacity for the common spatio-temporal zone.

Figure 3:
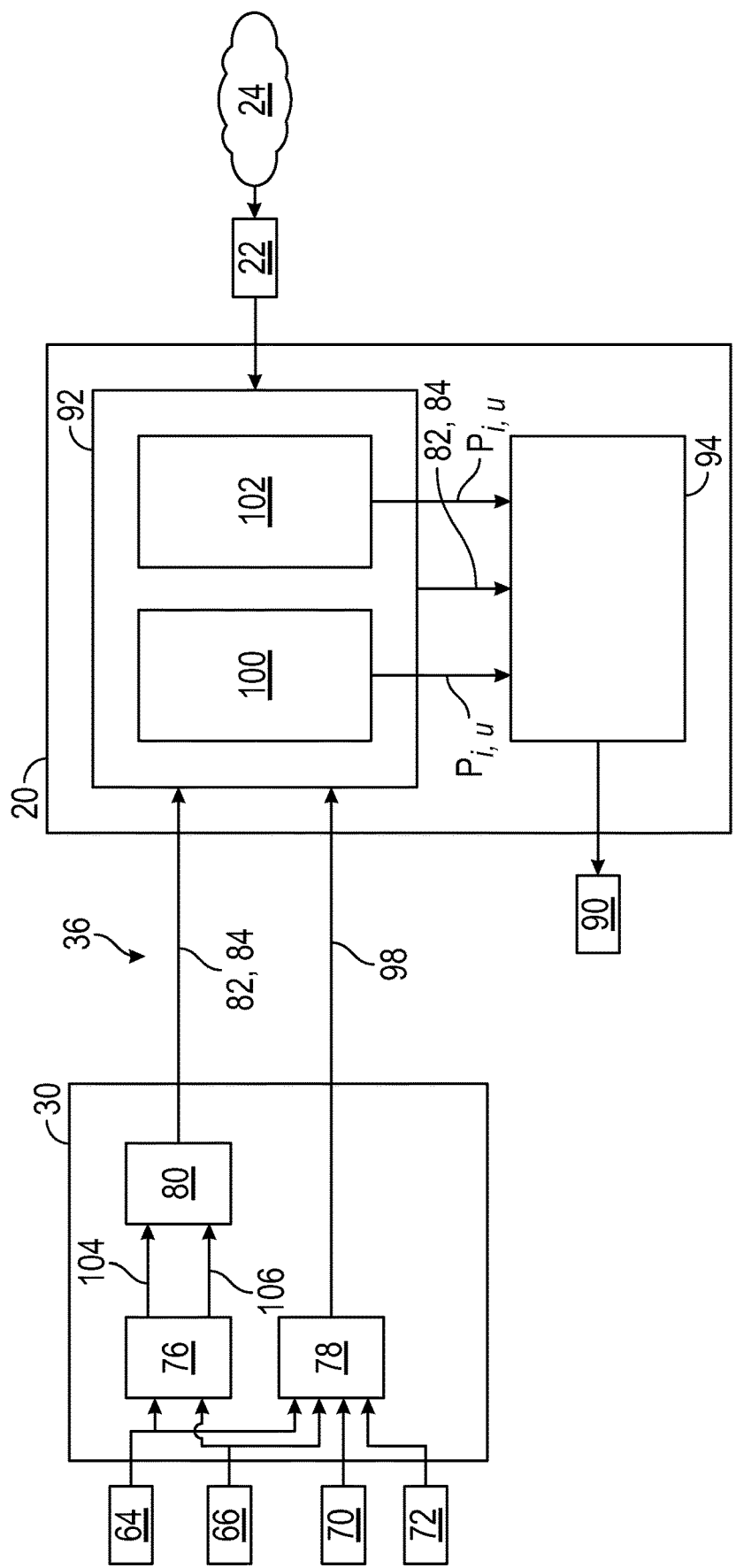
FIG. 3 is a block diagram of the one or more controllers of the vehicle shown in FIG. 2 in wireless communication with one or more central computers of the back-end office, according to an exemplary embodiment.

In the embodiment as shown in FIG. 2, the plurality of sensors and systems 18 of the vehicle 12 include a traction control system (TCS) 38, an anti-lock braking system (ABS) 40, an electronic stability system (ESC) 42, a brake torque sensor 44, an engine speed sensor 46, one or more cameras 48, and wheel speed sensors 50, however, it is to be appreciated that FIG. 2 is exemplary in nature and other sensors and systems may be used as well. For example, in addition to or in the alternative, the plurality of sensors and systems 18 of the vehicle 12 may include a brake pedal position sensor, a brake pressure sensor, or a vehicle speed signal. In addition to the plurality of sensors and systems 18, the vehicle 12 also includes a plurality of environmental context sensors 54 in electronic communication with the one or more controllers 30 that provide external environment information 70 (FIG. 3). In the example as shown in FIG. 2, the plurality of environmental context sensors 54 include a clock 56 for indicating time, a global positioning system (GPS) 58 for determining a position of the vehicle 12, a windshield wiper signal 60 for detecting if the windshield wipers are activated, temperature sensors 61 for determining an ambient temperature, pressure sensors 62 for determining the ambient pressure, and relative humidity sensors 63 for determining ambient relative humidity. However, it is to be appreciated that the figures are merely exemplary in nature and other types of environmental context sensors may be used as well such as, for example, windshield rain sensors.

The plurality of sensors and systems 18 of the vehicle 12 each produce a response that is indicative of the road surface traction capacity for the common spatio-temporal zone. Specifically, the response includes both high excitation context 64 and low excitation context 66 (seen in FIG. 3), where the high excitation context 64 indicates the vehicle 12 is undergoing an event producing high energy excitation or a high energy event, such as, for example, when the vehicle 12 undergoes a sudden stop. The low excitation context 66 indicates the vehicle 12 is undergoing an event producing light or low energy excitation or a low energy event such as, for example, steady-state driving. It is to be appreciated that some of the sensors 18 of the vehicle 12 generate a response indicating both high excitation context 64 and low excitation context 66.

For example, activation of the TCS 38, the ABS 40, and the ESC 42 is a response (FIG. 3) to a high excitation context 64. The activation of the TCS 38, the ABS 40, and/or the ESC 42 indicates that the tire grip capability of the road-tire interaction has been exceeded. Higher frequency of occurrences of TCS 38, ABS 40, and ESC 42 in comparison to historical trends may indicate a potentially low traction condition along the roadway the vehicle 12 is traveling upon. The brake torque sensor 44 (or a brake pedal position sensor or a brake pressure sensor) and the engine speed sensor 46 may generate a response indicating either high excitation context 64 or low excitation context 66 (FIG. 3) depending upon a specific condition that is being monitored. That is, when the brake torque sensor 44 is monitoring braking torque during routine driving conditions, the brake torque sensor 44 and the engine speed sensor 46 generate a response indicating low excitation context 66. Routine driving conditions may include soft or moderate braking. However, the brake torque sensor 44 generates a response indicating high excitation context 64 in response to detecting hard or sudden braking.

Similarly, when the engine speed sensor 46 is monitoring the speed of the engine during routine driving conditions, then the engine speed sensor 46 generates a response indicating low excitation context 66 (FIG. 3). Routine driving conditions may include steady-state engine speed or during moderate acceleration. However, the engine speed sensor 46 generates a response indicating high excitation context 64 in response to detecting a sudden or fast increase in engine speed or, alternatively, a sudden or fast decrease in engine speed. It is to be appreciated that a sudden or fast increase or decrease in engine speed indicates a high excitation context 64 along the roadway the vehicle 12 is traveling upon.

The one or more cameras 48 generate images that show the environment surrounding the vehicle 12. The environment surrounding the vehicle 12 is indicate of ambient conditions that affect traction conditions along the roadway the vehicle 12 is traveling upon. The one or more controllers 30 execute machine learning methods to classify the road condition based on images generated by the camera 48, along with the output generated by the plurality of environmental context sensors 54. It is to be appreciated that the one or more controllers 30 may classify the road conditions even when there is little to no vehicle dynamic inputs. Accordingly, the images generated by the one or more cameras 48 indicate low excitation context 66 (FIG. 3). Computer vision-based methods may be used to classify the road condition, for example, dry, wet, snowy, icy or gravel. The classification method results may be mapped to an estimated range for the road traction.

Other low excitation contexts may be employed to estimate the road traction of the vehicle 12 including those based on lateral vehicle dynamics and those based on longitudinal vehicle dynamics along with other vehicle sensors. In each of these cases, the TCS 38, the ABS 40, and the ESC 42 are not activated as there is low excitation energy input. In each of these cases, an estimate for the road traction may be made by the plurality of sensors and systems 18 of vehicle 12.

In addition to the plurality of sensors and systems 18 and the plurality of environmental context sensors 54, the one or more controllers 30 of the vehicle 12 also receive input from one or more remaining vehicle controllers 68 that are part of vehicle 12. The one or more remaining vehicle controllers 68 send vehicle-based contextual information 72 (seen in FIG. 3) regarding the vehicle 12. Some examples of the vehicle-based contextual information 72 include, but are not limited to, vehicle type, tire condition (such as tire wear state, and tire pressure), and driver behavior. Specifically, vehicle type indicates a specific type of vehicle such as sedan, truck, or sport utility vehicle, and driver behavior indicates a style in which a driver operates the vehicle 12. For example, in an embodiment, the driver behavior may be categorized into conservative, moderate, or aggressive classifications.

FIG. 3 is a block diagram of the one or more controllers 30 of the vehicle 12 shown in FIG. 2 in wireless communication with the one or more central computers 20 of the back-end office 14. The one or more controllers 30 include an intensification module 76, a context engine sub-module 78, and a normalization module 80. As seen in FIG. 3, the one or more controllers 30 receive as input the high excitation context 64 and the low excitation context 66 from the plurality of sensors and systems 18, the external environment information 70 from the plurality of environmental context sensors 54, and the vehicle-based contextual information 72 from the one or more remaining vehicle controllers 68. It should also be noted, that in an alternate embodiment, the modules 76, 78 and 80 may in whole or in part be included in the central computers 20.

The intensification module 76 receives the high excitation context 64 and the low excitation context 66 as input and applies an intensification gain to both the high excitation context 64 and the low excitation context 66. The intensification gain is applied to both the high excitation context 64 and the low excitation context 66 to quantify the severity of the corresponding potentially low traction condition. A value of the intensification gain is a function of one or more operating parameters of the vehicle 12. The one or more operating parameters include information such as, but not limited to, vehicle speed, brake pedal position, brake pressure, road bank angle, road bank grade, event duration, or proximity to key areas such as schools or hospitals. The relationship between the value of the high-excitation intensification gain and the one or more operating parameters may be expressed in a variety of ways such as, for example, a functional relationship or a look-up table.

Figure 4A:
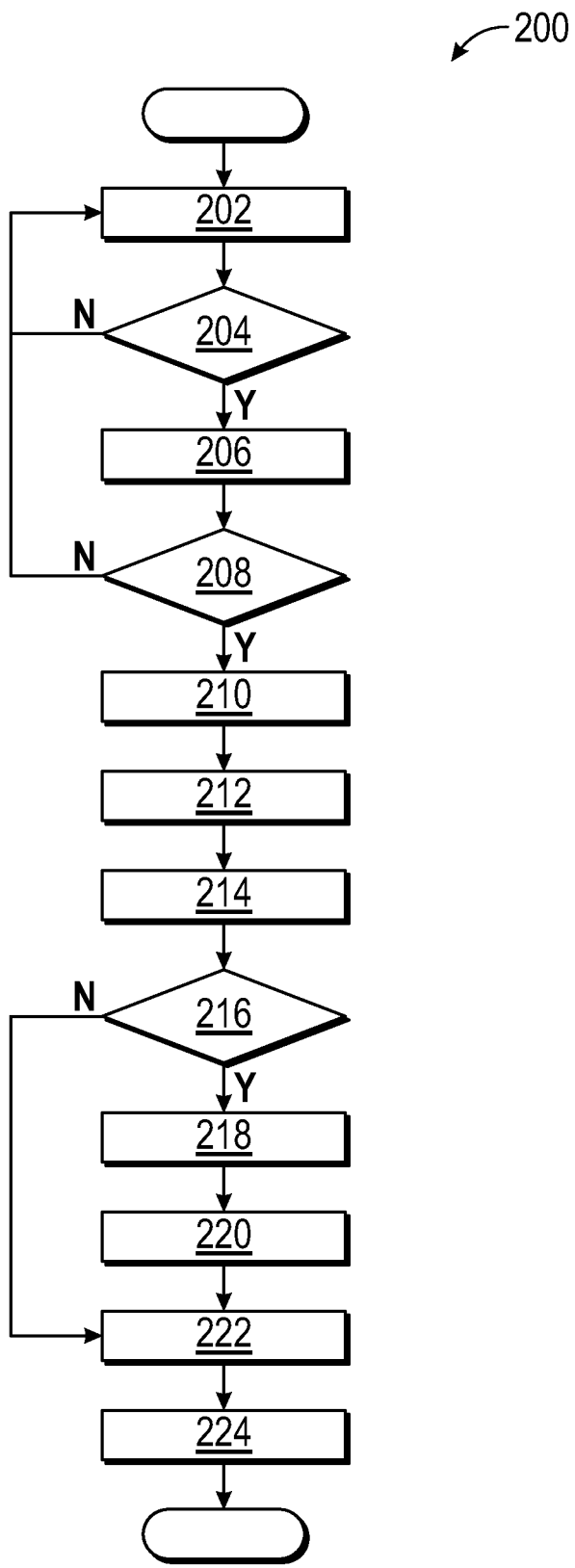
FIG. 4A is a process flow diagram illustrating a method for determining an ABS traction level, according to an exemplary embodiment.
Figure 4B:
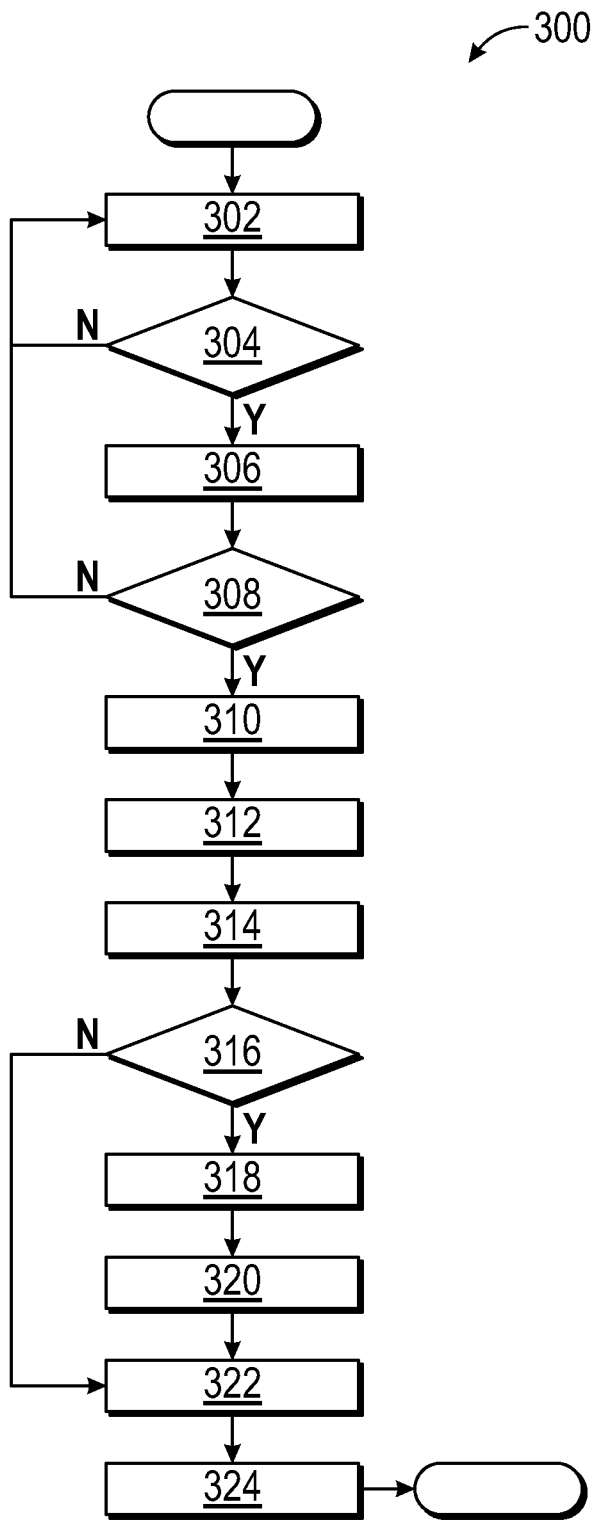
FIG. 4B is a process flow diagram illustrating a method for determining a TCS traction level, according to an exemplary embodiment.

The normalization module 80 receives as input, intensity adjusted high excitation context 104 and intensity adjusted low excitation context 106 from the intensification module 76 and determines a normalized intensity value indicating a level of traction for the selected one of the plurality of vehicles 12. In the embodiment as shown in FIG. 3, the normalized intensity value is either a high excitation traction level 82 or a low excitation traction level 84. The high excitation traction level 82 may be based on ABS or TCS activations. For example, a high excitation ABS traction level 82 (ABS traction level 82) or a high excitation TCS traction level 82 (TCS traction level 82) may be based on activation of the ABS 40 or the TCS 38, respectively. The low excitation traction level 84 may be based on a vision-based, a lateral, or a longitudinal dynamic model, or machine learning based methods. Specifically, FIG. 4A illustrates a process flow diagram illustrating a method 200 for determining the ABS traction level 82 based on activating the ABS 40, and FIG. 4B illustrates a process flow diagram illustrating a method 300 for determining the TCS traction level 82 based on activating the TCS 38.

It is to be appreciated that in an embodiment, the ABS traction level 82 and the TCS traction level 82 are classified into a plurality of different levels indicating varying levels of traction. For example, in one embodiment, the ABS traction level 82 and the TCS traction level 82 include three levels, namely, a high traction level, a medium traction level, and a low traction level. Referring now to FIGS. 2, 3, and 4A, the method 200 may begin at block 202. In block 202, the one or more controllers 30 determine the vehicle 12 is decelerating. For example, in an embodiment, the one or more controllers 30 determine the vehicle 12 is decelerating based on output from an inertial measurement unit (IMU) sensor, however, other approaches may be used as well. The method 200 may then proceed to decision block 204.

In decision block 204, the one or more controllers 30 determine if the deceleration detected in block 202 is greater than a threshold deceleration, and if so, then the one or more controllers 30 determine a potential braking event has occurred. The threshold deceleration is selected to indicate that at least a deceleration greater than a light braking event has occurred. For example, in one embodiment, the threshold deceleration rate is about 0.4 m/s$^2$. If the deceleration is equal to or less than the threshold deceleration, then the method 200 returns to block 202. Otherwise, the method 200 may proceed to block 206.

In block 206, the one or more controllers 30 continue to monitor the potential braking event of the vehicle 12. For example, the potential braking event may be characterized by the brake pedal position or the brake pressure in combination with the vehicle speed. The method 200 may then proceed to decision block 208.

In decision block 208, the one or more controllers 30 determine if the potential braking event determined in block 204 is a braking event of interest by comparing the brake pedal position (or brake pressure) and the vehicle speed monitored in block 206 with respective threshold brake and vehicle speed values. If the brake pedal position (or brake pressure) and vehicle speed are greater than their respective threshold values, then the method 200 may proceed to block 210, otherwise the method 200 returns to block 202.

In block 210, the one or more controllers 30 monitor the clock 56 for time and the GPS 58 for the position of the vehicle 12 in combination with other contextual information. The method 200 may then proceed to block 212.

In block 212, the one or more controllers 30 determine a spatio-temporal zone based on the time from the clock 56 and the position of the vehicle 12 from the GPS 58. A spatio-temporal zone represents a mapping of the vehicle 12 to a geo-location and time as a function of a change in time and a spatial region. For example, in an embodiment, the time may be segregated based on ten minute increments and the spatial region is a zone that covers 2500 square meters (50 meters×50 meters) expressed in longitudinal and latitudinal values. The method 200 may then proceed to block 214.

In block 214, the one or more controllers 30 may then increment a braking event of interest counter by 1. The braking event of interest counter keeps track of a total number of braking events of interest that occurred within the spatio-temporal zone for the vehicle 12. The method 200 may then proceed to decision block 216.

In block 216, the one or more controllers 30 determines the activity of the ABS 40. If the ABS 40 is not active, then the method 200 proceeds to block 222, which is described below. However, if the ABS 40 is active, then the method 200 proceeds to block 218.

In block 218, in response to determining the ABS 40 is active, the one or more controllers 30 apply an intensification gain to the active ABS event incident resulting in a score for counting an active ABS event. The score for the active ABS event is a number greater than or equal to 1. The intensification gain is based on a functional relationship or look-up table with variables such as, but not limited to, vehicle speed, brake pedal position, brake pressure, event duration, road bank angle and grade and proximity to key areas (e.g., schools or hospitals). The method 200 may then proceed to block 220.

In block 220, the one or more controllers 30 may increment an active ABS event counter by the score for the active ABS event, where the active ABS event counter keeps track of a total ABS event score based on the sum of the scores for each of the active ABS events during a given period of time for the vehicle 12. The method 200 may then proceed to block 222.

In block 222, the one or more controllers 30 calculate a spatio-temporal ABS intensity based on the total number of braking events of interest from the braking event of interest counter described in block 214 and the total ABS event score from the active ABS event counter described in block 220. Specifically, the spatio-temporal ABS intensity is a value determined by the total ABS event score divided by the total number of braking events of interest. For example, if the total ABS event score is relatively large in comparison to the number of braking events of interest, then the roadways are likely very slippery, however, if the total ABS event score is relatively small in comparison to the number of braking events of interest, then the road is likely not as slippery. If no braking events of interest are recorded, then the spatio-temporal ABS intensity is not available, and no insights are derived. The intensification gain that is applied in block 218 intensifies the total ABS event score based on factors such as, for example, vehicle speed, since activating the ABS 40 may be more noteworthy when a vehicle is traveling at high speeds (e.g., 100 kilometers per hour (kph)) versus slower speeds (e.g., 20 kilometers per hour). The method 200 may then proceed to block 224.

In block 224, the one or more controllers 30 determine the ABS traction level 82. In one embodiment, the ABS traction level 82 is a high traction level when the spatio-temporal ABS intensity is less than a first predetermined calibration value. The ABS traction level 82 is a medium traction level when the spatio-temporal ABS intensity is greater than or equal to the first predetermined calibration value but less than a second predetermined calibration value. Finally, the ABS traction level 82 is a low traction level when the spatio-temporal ABS intensity is greater than or equal to the second predetermined calibration value. The first and second predetermined calibration values are determined based on a specific application and factors such as, for example, regional considerations and vehicle type. The method 200 may then terminate or, in the alternative, return to block 202.

The method 300 for determining the TCS traction level 82 is now described. Referring to FIGS. 2, 3, and 4B, the method 300 may begin at block 302. In block 302, the one or more controllers 30 monitor the vehicle speed. The method 300 may then proceed to decision block 304.

In decision block 304, the one or more controllers 30 determine if the vehicle speed is less than a threshold vehicle speed. The threshold vehicle speed is selected to represent a speed window where the TCS 38 is more likely to be activated as the vehicle 12 accelerates on a slippery road. In an embodiment, the threshold vehicle speed is about 25 kph. If the vehicle speed is equal to or greater than the threshold vehicle speed, then the method 300 returns to block 302. However, if the vehicle speed is less than the threshold vehicle speed, then the method 300 may proceed to block 306.

In block 306, the one or more controllers 30 monitor engine speed from the engine speed sensor 46 (seen in FIG. 2), a commanded torque signal, and an accelerator pedal position. The method 300 may then proceed to decision block 308.

In decision block 308, the one or more controllers 30 determine if a combination of the engine speed, the commanded torque signal, and the accelerator pedal position monitored in block 306 are greater than their respective threshold values. In other words, the one or more controllers 30 determine a trigger event indicating the driver intent is to accelerate above a nominal value. If a combination of the engine speed, commanded torque signal, and the accelerator pedal position indicates the driver intent is not to accelerate above a nominal value, then the method 300 returns to block 302. However, if a combination of the engine speed, the commanded torque signal, and the accelerator pedal position indicates the driver intent is to accelerate above a nominal value, then the method 300 may proceed to block 310.

In block 310, the one or more controllers 30 monitor the clock 56 for time and the GPS 58 for the position of the vehicle 12, along with other contextual information. The method 300 may then proceed to block 312.

In block 312, the one or more controllers 30 determine the spatio-temporal zone based on the time from the clock 56 and the position of the vehicle 12 from the GPS 58. As mentioned above, the spatio-temporal zone represents a mapping of the vehicle 12 to a geo-location and time as a function of a change in time and a spatial region. The method 300 may then proceed to block 314.

In block 314, the one or more controllers 30 may then increment an acceleration event of interest counter by 1. The acceleration event of interest counter keeps track of a total number of acceleration events of interest that occurred within the spatio-temporal zone for the vehicle 12. The method 300 may then proceed to decision block 316.

In decision block 316, the one or more controllers 30 determines the activity of the TCS 38. If the TCS 38 is not active, then the method 300 proceeds to block 322, which is described below. However, if the TCS 38 is active, then the method 300 proceeds to block 318.

In block 318, in response to determining the TCS 38 is active, the one or more controllers 30 apply an intensification gain to an active TCS event incident resulting in a score for counting an active TCS event. The score for the active TCS event is a number greater than or equal to 1. The intensification gain is based on a functional relationship or look-up table with variables such as, but not limited to, accelerator pedal position, commanded torque, length of time that the TCS is activated, road bank angle and grade and proximity to key areas (e.g. schools or hospitals). The method 300 may then proceed to block 320.

In block 320, the one or more controllers 30 may increment an TCS event counter by the score for the active TCS event, where the TCS event counter keeps track of a total TCS event score based on the sum of the scores for each of the active TCS events during a given period of time for the vehicle 12. The method 300 may then proceed to block 322.

In block 322, the one or more controllers 30 calculate a spatio-temporal TCS intensity based on the total number of acceleration events of interest during the spatio-temporal zone for the vehicle 12 from the acceleration event of interest counter and the total TCS event score from the TCS event counter. Specifically, the spatio-temporal TCS intensity is a value determined by dividing the total TCS event score divided by the total number of acceleration events of interest. The method 300 may then proceed to block 324.

In block 324, the one or more controllers 30 determine the TCS traction level 82. In one embodiment, the TCS traction level 82 is a high traction level when the spatio-temporal TCS intensity is less than a first predetermined calibration value. The TCS traction level 82 is a medium traction level when the spatio-temporal TCS intensity is greater than or equal to the first predetermined calibration value but less than a second predetermined calibration value. Finally, the TCS traction level 82 is a low traction level when the spatio-temporal TCS intensity is greater than or equal to the second predetermined calibration value. The method 300 may then terminate or, in the alternative, return to block 302.

Referring to FIG. 3, the context engine sub-module 78 of the one or more controllers 30 of the vehicle 12 is configured to extract vehicle contextual parameters 98 based on the input, which includes the high excitation context 64 and the low excitation context 66 from the plurality of sensors and systems 18, the external environment information 70 from the plurality of environmental context sensors 54, and the vehicle-based contextual information 72 from the one or more remaining vehicle controllers 68. The vehicle contextual parameters 98 are indicative of the state of the vehicle, driver, roadway and environment during a potentially low traction condition along the roadway the vehicle 12 is traveling upon. Some examples of the vehicle contextual parameters 98 include, but are not limited to, vehicle type, vehicle mass estimation, trailer connection status, tire health, driver behavior (conservative, moderate, or aggressive), road bank angle, road bank grade, road roughness, road class (highway, rural, etc.), and precipitation level. For example, the context engine sub-module 78 determines precipitation level context based on the windshield wiper signal 60 (FIG. 2), where a high level of precipitation indicates that there is a potentially low traction condition along the roadway.

The plurality of parameters 36 determined by the one or more controllers 30 include the high excitation context 64, the low excitation context 66, the external environment information 70, the vehicle-based contextual information 72, the ABS and TCS traction levels 82 determined by the normalization module 80, the low excitation traction level 84, and the vehicle contextual parameters 98 from the context engine sub-module 78. The plurality of parameters 36 are sent to the one or more central computers 20 of the back-end office 14. As explained below, the one or more central computers 20 aggregates and fuses the plurality of parameters 36 from the plurality of vehicles 12 (FIG. 1) together in combination with the weather and application programming interface data 22 to determine a road surface traction capacity value 90 for the common spatio-temporal zone. Some examples of the weather and application programming interface data 22 include, but are not limited to, precipitation, humidity, number of lanes in road, type of road (e.g., freeway, etc.), road surface (paved versus gravel), age of road, map data, bank angle of road, road curvature, on road segment edge or at node, and grade of road.

The one or more central computers 20 include a vehicle data module 92 and a context-aware aggregation module 94. The vehicle data module 92 includes a perfect context match sub-module 100 and a partial context match sub-module 102. As explained below, the perfect context match sub-module 100 determines a perfect match value between two or more contextual data points between two or more discrete vehicles 12 that are part of the plurality of vehicles 12 (FIG. 1), where the two or more contextual data points are part of the plurality of parameters 36. A perfect contextual match indicates two or more contextual data points between the two discrete vehicles 12 are of the same contextual data type (e.g., contextual data points are related to vehicle type, weather context, or both). Specifically, referring to FIGS. 1 and 3, the two discrete vehicles 12 include a selected vehicle a and a neighboring vehicle u, where the neighboring vehicle u is part of the plurality of vehicles 12 located within the common spatio-temporal zone. The contextual data types include, but are not limited to, temporal context data (such as time of day or season), spatial context (such as latitude and longitudinal coordinates), weather context data including wiper status, ambient air temperature, ambient air pressure, presence of rain, vehicle type, tire wear condition, lane context (such as number of lanes on a roadway), road surface condition, driver behavior (conservative, moderate, or aggressive), the high excitation context 64, and the low excitation context 66.

In an embodiment, the perfect match value from one or more neighboring vehicles is determined based on Equation 1, which is:

$$\frac{\sum_{k \in N}(r_{u,i} - r_a) \times sim(a, u)\omega(a)}{\sum_{k \in N} sim(a, u)} \quad \text{Equation 1}$$

where $r_a$ is the traction level (82 and or 84) of the selected vehicle a with respect to the contextual data point, $r_{u,\,i}$ is the traction level (82 and or 84) of the neighboring vehicle u, sim(a, u) represents a context similarity between the selected vehicle a and neighboring vehicle u, and $\omega(a)$ is a participant weight for the selected vehicle a. The participant weight $\omega(a)$ is a calibrated value that is based on a variety of factors such as, but not limited to, reading confidence and vehicle type. Once the perfect context match sub-module 100 determines the perfect match between the two discrete vehicles 12 (i.e., the selected vehicle a and the neighboring vehicle u), then the corresponding two or more contextual data points are sent to a collaborative filter such as, for example, a kth-nearest neighbors (kNN) filter to determine a group of perfectly matched vehicles 12 that include context values that perfectly match the selected vehicle a (FIG. 1). The perfect match value determined by Equation 1 is then sent to context-aware aggregation module 94.

The partial context match sub-module 102 determines a partial match value between the two contextual data points between the two discrete vehicles 12, where the two contextual data points are part of the plurality of parameters 36. A partial contextual match indicates that that two contextual data points between the two discrete vehicles 12 are of partially similar contextual data types (e.g., both the vehicles have contextual data points that are related to vehicle type, but the contextual data point of one of the vehicles is related to weather context while the contextual data point of the remaining vehicle is related to road type). In an embodiment, the partial match value is determined based on Equation 2, which is:

$$J(X, Y, w) \times \frac{\sum_{u \in M}(r_{u,i} - r_a) \times sim(a, u)\omega(a)}{\sum_{u \in M} sim(a, u)}$$

where $r_a$ is the traction level (82 and or 84) the selected vehicle a with respect to the contextual data point, $r_{u,i}$ is the traction level (82 and or 84) of the vehicle u with respect to the contextual data point, sim(a, u) represents the context similarity between the selected vehicle a and vehicle u, $\omega(a)$ is the participant weight for the selected vehicle a, X and Y represent two data sets for comparison and matching to determine a Jaccard weight, and w is a function to convert the data sets corresponding to X and Y into real values. Once the partial context match sub-module 102 determines the partial match value between the two discrete vehicles 12 (i.e., the selected vehicle a and neighboring vehicle u), then the corresponding two contextual data points are sent to a collaborative filter (e.g., a kNN filter) to determine a group of matched vehicles 12 having context values that partially match the selected vehicle a (FIG. 1). The partial match value determined by Equation 2 is then sent to context-aware aggregation module 94.

The context-aware aggregation module 94 determines a final traction capacity estimation $P_{u,i}$ based on the traction level (82 and or 84) corresponding to the selected vehicle a, the perfect match value determined by the perfect context match sub-module 100, and the partial match value determined by the partial context match sub-module 102. Specifically, the context-aware aggregation module 94 determines the final traction capacity estimation $P_{u,i}$ based on Equation 3, which is as follows:

$$P_{u,i} = r_a + \frac{\sum_{u \in N}(r_{u,i} - r_a) \times sim(a, u)\omega(a)}{\sum_{u \in N} sim(a, u)} + \quad \text{Equation 3}$$

$$J(X, Y, w) \times \frac{\sum_{u \in M}(r_{u,i} - r_a) \times sim(a, u)\omega(a)}{\sum_{u \in M} sim(a, u)}$$

where the final traction capacity estimation $P_{u,i}$ is equal to the road surface traction capacity value 90 for the common spatio-temporal zone and u denotes the neighboring vehicle.

Referring generally to the figures, the disclosed distributed computing system provides a deployable method to determine road surface traction capacity for roadways located in a common spatio-temporal zone. It is to be appreciated that the algorithms are distributed between the back-end office, which acts as a server, as well as the plurality vehicles, which act as clients. It is to be appreciated that the vehicles perform edge-based processing to determine various parameters, while the back-end office aggregates and fuses the data from the plurality vehicles together. Various municipalities and governmental agencies may determine when to salt or de-ice various roadways within the common spatio-temporal zone based on the road surface traction capacity determined by the distributed computing system.

The controllers may refer to, or be part of an electronic circuit, a combinational logic circuit, a field programmable gate array (FPGA), a processor (shared, dedicated, or group) that executes code, or a combination of some or all of the above, such as in a system-on-chip. Additionally, the controllers may be microprocessor-based such as a computer having a at least one processor, memory (RAM and/or ROM), and associated input and output buses. The processor may operate under the control of an operating system that resides in memory. The operating system may manage computer resources so that computer program code embodied as one or more computer software applications, such as an application residing in memory, may have instructions executed by the processor. In an alternative embodiment, the processor may execute the application directly, in which case the operating system may be omitted.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A distributed computing system for determining road surface traction capacity for roadways located in a common spatio-temporal zone, the distributed computing system comprising:
   a plurality of vehicles that each include a plurality of sensors and systems that collect and analyze a plurality of parameters related to road surface conditions in the common spatio-temporal zone, wherein the plurality of parameters include a traction level for a selected vehicle that represents an ego vehicle, and wherein the plurality of sensors and systems produce a response indicating a condition indicative of the road surface traction capacity for the common spatio-temporal zone and the response is a high excitation context, a low excitation context, or both; and
   one or more central computers in wireless communication with each of the plurality of vehicles, wherein the one or more central computers execute instructions to:
      determine at least one of a perfect match value and a partial match value between two contextual data points between two discrete vehicles that are part of the plurality of vehicles, where the two contextual data points are part of the plurality of parameters; and
      combine at least one of the perfect match value and the partial match value with the traction level corresponding to the selected vehicle to determine a road surface traction capacity value for the common spatio-temporal zone.

2. The distributed computing system of claim 1, wherein the perfect match value indicates that the two contextual data points between the two discrete vehicles are of the same contextual data type and the partial match value indicates the two contextual data points between the two discrete vehicles are of partially similar contextual data types.

3. The distributed computing system of claim 2, wherein the perfect match value is determined based on:

$$\frac{\sum_{u \in N}(r_{u,i} - r_a \times sim(a, u)\omega(a))}{\sum_{u \in N} sim(a, u)}$$

wherein $r_a$ is the traction level of the selected vehicle with respect to one of the two contextual data points, $r_{u,i}$ is the traction level of a neighboring vehicle, sim(a, u) represents a context similarity between the selected vehicle and the neighboring vehicle, ω(a) is a participant weight for the selected vehicle and u denotes the neighboring vehicle.

4. The distributed computing system of claim 3, wherein the partial match value is determined based on:

$$J(X, Y, w) \times \frac{\sum_{u \in M}(r_{u,i} - r_a \times sim(a, u)\omega(a))}{\sum_{u \in M} sim(a, u)}$$

wherein X and Y represent two data sets for comparison and matching to determine a Jaccard weight, w is a function to convert the two data sets corresponding to X and Y into real values, and J(X, Y, w) represents the Jaccard weight.

5. The distributed computing system of claim 4, wherein the road surface traction capacity value for the common spatio-temporal zone is determined based on:

$$P_{u,i} = r_a + \frac{\sum_{u \in N}(r_{u,i} - r_a \times sim(a, u)\omega(a))}{\sum_{u \in N} sim(a, u)} + J(X, Y, w) \times \frac{\sum_{u \in M}(r_{u,i} - r_a \times sim(a, u)\omega(a))}{\sum_{u \in M} sim(a, u)}$$

wherein $P_{u,i}$ represents the road surface traction capacity value for the common spatio-temporal zone.

6. The distributed computing system of claim 2, wherein the contextual data types include one or more of the following: temporal context data, spatial context data, weather context data including wiper status, temperature, pressure, and presence of rain, vehicle type, tire wear condition, lane context, road surface condition, driver behavior, high excitation context collected from the plurality of sensors and systems, and low excitation context collected from the plurality of sensors and systems.

7. The distributed computing system of claim 1, wherein an intensification gain to the high excitation context and the low excitation context is applied.

8. The distributed computing system of claim 7, wherein one or more controllers of a corresponding vehicle that is part of the plurality of vehicles determine a level of traction for the selected vehicle based on an intensity adjusted high excitation context and an intensity adjusted low excitation context.

9. The distributed computing system of claim 8, wherein the high excitation context is either an anti-lock braking system (ABS) traction level or a traction control system (TCS) traction level.

10. The distributed computing system of claim 9, wherein the ABS traction level and the TCS traction level are classified into a plurality of different levels indicating varying levels of traction.

11. The distributed computing system of claim 9, wherein the ABS traction level is determined based on a deceleration of a specific vehicle, a spatio-temporal zone representing a mapping of the specific vehicle to a geo-location and time, and a spatio-temporal ABS intensity based on a total number of braking events of interest and a total ABS event score.

12. The distributed computing system of claim 9, wherein the TCS traction level is determined based on a vehicle speed, a spatio-temporal zone representing a mapping of a specific vehicle to a geolocation and time, and a spatio-temporal TCS intensity based on a total number of acceleration events of interest and a total TCS event score.

13. The distributed computing system of claim 8, wherein the one or more controllers extract vehicle contextual parameters based on the high excitation context, the low excitation context, external environment information from a plurality of environmental context sensors, and vehicle-based contextual information collected by one or more remaining vehicle controllers.

14. The distributed computing system of claim 1, wherein the plurality of sensors and systems of each of the plurality of vehicles include one or more of the following:
a TCS, an ABS, an electronic stability system (ESC), a brake pedal position sensor, a brake pressure sensor, a brake torque sensor, an engine speed sensor, wheel speed sensors, an inertial measurement unit sensor, an accelerator pedal position sensor, a vehicle speed signal, a commanded torque signal and one or more cameras.

15. The distributed computing system of claim 1, wherein the one or more central computers receives weather and application programming interface data related to the common spatio-temporal zone over a network.

16. The distributed computing system of claim 15, wherein the weather and application programming interface data includes one or more of the following:
precipitation, humidity, number of lanes in road, type of road, road surface, age of road, map data, bank angle of road, road curvature, on road segment edge or at node, and grade of road.

17. The distributed computing system of claim 1, wherein the common spatio-temporal zone represents a common geographical area and time step experiencing similar weather conditions, wherein an overall size of a common geographical location and time step is adjustable.

18. A method for determining road surface traction capacity for roadways located in a common spatio-temporal zone utilizing a plurality of vehicles that each include a plurality of sensors and system, the method comprising:
receiving, by one or more central computers that are part of a back-end office, a plurality of parameters from the plurality of vehicles, wherein the plurality of parameters related to road surface conditions in the common spatio-temporal zone and the plurality of parameters include a traction level for a selected vehicle of the plurality of vehicles that represents an ego vehicle, and wherein the plurality of sensors and systems produce a response indicating a condition indicative of the road surface traction capacity for the common spatio-temporal zone and the response is a high excitation context, a low excitation context, or both;
determining, by the one or more central computers, at least one of a perfect match value and a partial match value between two contextual data points between two discrete vehicles that are part of the plurality of vehicles, where the two contextual data points are part of the plurality of parameters; and combining at least one of the perfect match value and the partial match value with the traction level corresponding to the selected vehicle to determine a road surface traction capacity value for the common spatio-temporal zone.

19. A distributed computing system for determining road surface traction capacity for roadways located in a common spatio-temporal zone, the distributed computing system comprising:
- a plurality of vehicles that each include a plurality of sensors and systems that collect and analyze a plurality of parameters related to road surface conditions in the common spatio-temporal zone, wherein the plurality of parameters include a traction level for a selected vehicle that represents an ego vehicle, and wherein the plurality of sensors and systems produce a response indicating a condition indicative of the road surface traction capacity for the common spatio-temporal zone and the response is a high excitation context, a low excitation context, or both, and wherein an intensification gain to the high excitation context and the low excitation context is applied; and
- one or more central computers in wireless communication with each of the plurality of vehicles, wherein the one or more central computers execute instructions to:
  - determine at least one of a perfect match value and a partial match value between two contextual data points between two discrete vehicles that are part of the plurality of vehicles, where the two contextual data points are part of the plurality of parameters; and
  - combine at least one of the perfect match value and the partial match value with the traction level corresponding to the selected vehicle to determine a road surface traction capacity value for the common spatio-temporal zone.

20. The distributed computing system of claim 19, wherein one or more controllers of a corresponding vehicle that is part of the plurality of vehicles determine a level of traction for the selected vehicle based on an intensity adjusted high excitation context and an intensity adjusted low excitation context.

* * * * *